Nov. 5, 1929.    R. F. BINGMAN    1,734,244
WRIST PIN JOINT
Filed Oct. 2, 1928
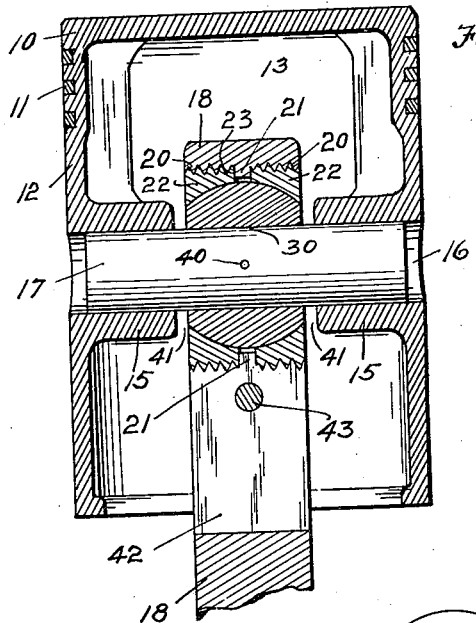
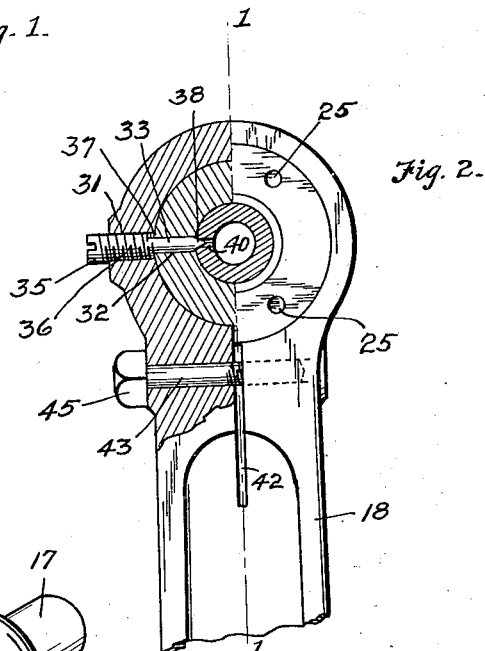
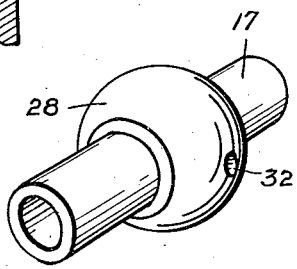
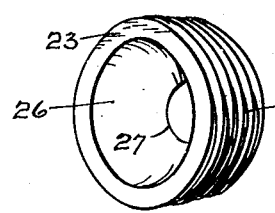
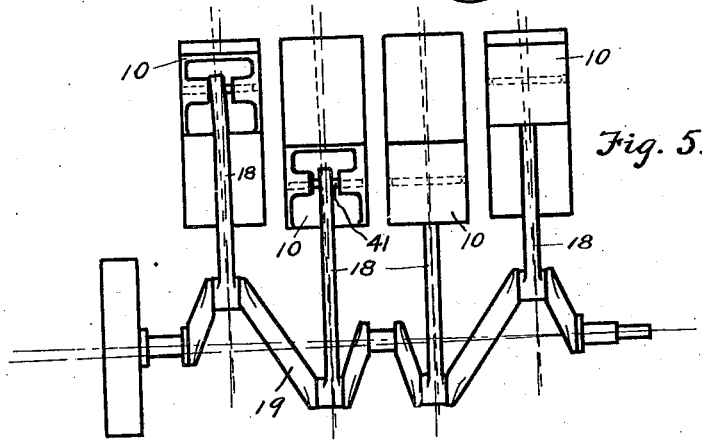
INVENTOR
ROBERT F. BINGMAN.
BY Horace Barnes
ATTORNEY Patented Nov. 5, 1929

1,734,244

UNITED STATES PATENT OFFICE

ROBERT F. BINGMAN, OF PORTLAND, OREGON

WRIST-PIN JOINT

Application filed October 2, 1928. Serial No. 309,789.

This invention relates to bearing connections between the pistons and connecting-rods of a reciprocating engine.

The object of my invention is to provide a wrist-pin joint between the piston and connecting-rod of simple and practicable construction to compensate for any misalignment of the wrist-pins from parallel relation with the crank-shaft and whereby angularly directed forces upon the piston are obviated and consequent undue and unequal wear upon the piston and cylinder-walls are avoided.

A further object of the invention is the provision of devices for the reduction of wear upon the joint between the connecting-rod and the wrist-pin to a minimum by affording angular readjustments in one direction only.

A still further object of the invention is to provide simple and efficient devices in a wrist-pin joint affording an improved and novel method for taking up any slack or wear that may occur therein.

Other objects and advantages, and objects relating to details of construction and arrangement of parts of the invention will be readily apparent in the course of the full description to follow.

The accompanying drawings illustrate by way of example a representative form of my invention, in which:

Figure 1 is a view in vertical section of a piston and connecting-rod therefor with the wrist-pin joint therebetween, the connecting-rod being broken away, and the line of section being substantially upon line 1—1 of Fig. 2.

Fig. 2 is a view partly in side elevation and partly in section of the upper portion of a connecting-rod with my improved wrist-pin joint illustrated thereon.

Fig. 3 is a detached perspective view of a wrist-pin and ball member mounted thereon.

Fig. 4 is a detached perspective view of one of the bushing elements of my invention.

Fig. 5 is a diagrammatic view in side elevation of an engine crank-shaft and connected pistons illustrating the purposes of the invention.

Referring to said views, the reference numeral 10 indicates a piston of ordinary construction provided with packing-rings 11 in its side walls 12 and having an interior chamber 13. Oppositely disposed integral bosses 15 extend inwardly from the side walls of the piston and which are bored diametrically, as at 16, to afford bearings for a wrist-pin 17 whereby the connecting-rod 18 is attached to the piston while its opposite end is connected to the crank-shaft 19 in the usual manner.

The upper end of said connecting-rod is formed with an eye consisting in screw-threaded bores 20 extending inwardly from opposite sides thereof and separated by a relatively shallow annular rib 21 at mid-distance from the opposite sides of the rod. Cupped bushings 22 are exteriorly screw-threaded and adapted to be screwed into the respective bores 20 from each side and bear at their inner edges 23 upon the opposite sides of the rib 21. The outer faces of said bushings are formed with recesses 25 to receive a wrench for setting or removing them from the bores. Said bushings are each formed with a substantially semi-globular socket 26 on its inner face and with an aperture 27 concentric with the axis of such socket and of the bores 20.

A metal ball 28 is formed with a diametrically disposed bore 30 through which it is mounted upon the wrist-pin and its globular exterior is adapted to effect a close working fit with the globular cavity formed by the bushing-sockets 26. The outer portions of the ball are planed perpendicular to the bore 30 in the plane of the side surfaces of the connecting-rod.

A screw-threaded hole 31 is formed in the eye of the connecting-rod extending horizontally from one side. A similarly positioned and registering hole 32 is formed in the ball 28 of reduced diameter through which the reduced end 33 of a retaining-pin 35 extends whose outer, larger and screw-threaded end 36 is secured in the hole 31 with a shoulder 37 bearing upon the ball. The extremity 38 of said pin extends into a hole 40 of the wrist-pin thus securing the entire wrist-pin joint from relative rotation or movement in the rotary direction of the crank-shaft while allowing complete freedom of oscillating movement of the connecting-rod about the axial-pin 35.

The connecting-rod being connected to the wrist-pin without relative movement therebetween except for angular readjustments about the axis of the pin 35 the wrist-pin is designed to rock in the bores 16 and is also slidable longitudinally therein for additional readjustment of the wrist-pin relative to the connection of the connecting-rod upon the crank-shaft through the provision of spaces 41 provided between the opposite sides of the connecting-rod and the bosses 15.

The upper end of the connecting-rod may be slotted, as at 42, vertically in line with the wrist-pin and extending from the lower side of the bores 20 along the shank of the connecting-rod for a short distance. A transversely disposed bolt 43 extends through the connecting-rod adjacent the bores 20 having a nut 45 on one end to pinch said slot together more or less or more firmly hold the bushings 22 in their set positions.

The above described construction allows of the self-adjustment of the connecting-rod upon the wrist-pin to overcome any misalignment of the wrist-pin from parallel relation with the crank-shaft so that the pistons will reciprocate in their cylinders without deflection due to the cramping of the connecting-rods upon the wrist-pins by a rigid connection of the connecting-rods causing a deflection thereof.

It will be apparent from an inspection of Fig. 5 that a slight error in alignment of the crank-shaft bearings in a vertical plane on either end will be accentuated in the upper ends of the connecting-rods until the pistons are inclined to work unevenly and cause marked wear upon the cylinder-walls. By affording opportunity for the connecting-rods to deflect in angular directions in the vertical plane of the wrist-pin and so arranging it to turn about a relatively fixed axis, such as the pin 35, I obviate this difficulty and reduce the wear upon the parts and particularly upon the ball and socket to a minimum.

Having described my invention, what I claim, is:

1. The combination with a piston having a pair of oppositely disposed bosses bored diametrically of the piston, a wrist-pin arranged in said bores, a ball mounted on said wrist-pin, a connecting-rod having an eye at its upper end formed with a screw-threaded bore extending inwardly from each side, a screw-threaded bushing engageable in said eye-bores from each of its opposite sides, said bushings co-operating to include a globular socket in which said ball is seated, and a pin extending horizontally through the connecting-rod, ball and into the wrist-pin providing an axis of oscillation for the connecting-rod in the vertical plane of the wrist-pin.

2. The combination of elements as specified in claim 1, including an integral annular rib extending interiorly of the eye in the connecting-rod intermediate of the two opposing bores therein, and affording a stop for the engagement upon its opposite sides of the inner ends of the bushings.

3. A piston, a wrist-pin disposed therein, a ball mounted on said wrist-pin, a connecting-rod having a globular socket to receive said ball, said socket being divided transversely of the wrist-pin, and an axis-pin extending through the connecting-rod and ball and into the wrist-pin limiting the connecting-rod to oscillatory movements in the vertical plane of the wrist-pin.

ROBERT F. BINGMAN.